(12) United States Patent
Yang et al.

(10) Patent No.: US 8,260,494 B2
(45) Date of Patent: Sep. 4, 2012

(54) METHOD AND APPARATUS TO OPTIMIZE ENERGY EFFICIENCY OF AIR COMPRESSOR IN VEHICLE AIR BRAKE APPLICATION

(75) Inventors: Aiqi Yang, Fort Mill, SC (US); Colin J. Casey, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 1190 days.

(21) Appl. No.: 12/060,971

(22) Filed: Apr. 2, 2008

(65) Prior Publication Data

US 2009/0254246 A1   Oct. 8, 2009

(51) Int. Cl.
 *G06F 7/00* (2006.01)
 *F02B 29/04* (2006.01)
(52) U.S. Cl. .............................. 701/36; 60/599
(58) Field of Classification Search .......... None
See application file for complete search history.

(56) References Cited

U.S. PATENT DOCUMENTS

| | | | |
|---|---|---|---|
| 2005/0220634 A1 | 10/2005 | Fogelstrom | |
| 2006/0045751 A1 | 3/2006 | Beckman et al. | |
| 2006/0168958 A1* | 8/2006 | Vetrovec | 60/599 |
| 2007/0137909 A1* | 6/2007 | Zillmer et al. | 180/65.2 |
| 2007/0246998 A1 | 10/2007 | Diekmeyer et al. | |
| 2008/0219866 A1* | 9/2008 | Kwong et al. | 417/410.1 |
| 2009/0120405 A1* | 5/2009 | Gerum | 123/198 |
| 2009/0205338 A1* | 8/2009 | Harmon et al. | 60/677 |
| 2009/0301796 A1* | 12/2009 | Wedderburn et al. | 180/2.2 |

FOREIGN PATENT DOCUMENTS

WO   WO 2005/014357 A1   2/2005

* cited by examiner

*Primary Examiner* — Thomas Tarcza
*Assistant Examiner* — Nagi Murshed
(74) *Attorney, Agent, or Firm* — Jeffrey P. Calfa; Mark C. Bach (57) ABSTRACT

In a pneumatic brake system for a motor vehicle, a variable speed electric motor is connected to a high voltage direct current power supply for variable energization, thus varying the operating rate of a compressor and the rate of pressurization of the brake system storage tanks. The operating rate of the compressor is varied responsive to pressure readings taken from the storage tanks during pressurization to minimize energy consumption.

8 Claims, 10 Drawing Sheets

FIG. 9

METHOD AND APPARATUS TO OPTIMIZE ENERGY EFFICIENCY OF AIR COMPRESSOR IN VEHICLE AIR BRAKE APPLICATION

BACKGROUND OF THE INVENTION

1. Technical Field

The present invention relates to compressed air supply systems for installation on vehicles, and more particularly to a method of and apparatus for driving a compressor in such systems.

2. Description of the Problem

Conventional motor vehicle air brake systems are supplied with air from a compressed air supply system. The compressed air supply system includes an air compressor which has conventionally been driven by a mechanical linkage from the vehicle engine. The mechanical linkage is typically a belt, though a chain or gear connection is possible. The linkage is not readily released, and thus operates whenever the engine is running, even if the maximum desired air pressure in a system storage tank has been reached.

Various problems have been recognized with this arrangement. While the system is simple, it imposes a load on the engine which is parasitic (typically absorbing 2 horsepower) when the system storage tank is at maximum capacity because the pump/air compressor continues to run. The potential parasitic load on the engine is highest when it is running at high RPMs. The general issue of parasitic loads in motor vehicles has been recognized by the United States Department of Energy, which has sponsored a project called the "More Electric Truck" which contemplates replacing mechanical drives for accessories with electric motor(s) and thereby eliminating the source of much parasitic loss on vehicles. The direct mechanical linkage means that the compressor in such systems runs at a speed directly proportional to engine speed. The potential need to deliver high air flow to maintain system pressure or to support operation of systems utilizing air during periods of low engine speed may force the use of relatively high capacity, and therefore relatively heavy, components. Locations for installation of the compressor have been limited, as a practical matter, to the engine compartment, where space may be limited.

Beckman, et al., US 2006/0045751 taught an air compressor system for non-vehicle applications in which he proposed an embodiment using a variable speed electric motor to drive the air compressor. Beckman pointed out that prior art compressor systems utilizing electrical motors had the electrical motors operate at fixed speeds. As a result, the load on the motor increased as pressure in the compressed air reservoir increased and as a result more and more power was drawn until the pressure cutoff level was reached. Beckman's use of a variable speed electric motor allowed motor speed and pump speed to be varied. So doing allowed the motor "to operate at its maximum potential at all pressures". Three operating modes were described, including a maximum mode in which the maximum allowable amperage was drawn, a "quiet mode" where the maximum amperage allowed is reduced, and an "optimum mode" where the motor was run at a minimum speed to maintain a target pressure. Broadly generalizing, Beckman's use of a variable speed motor allowed a user to select either an operating speed or a current limit. If a current limit was chosen operating speed of the motor was varied, as long as the motor was running, to keep the current drawn at the limit value.

SUMMARY OF THE INVENTION

The invention provides a compressed air supply system for a motor vehicle including an air compressor, a variable speed electric motor coupled to the air compressor to drive the air compressor, an electric power source, a thermal engine supplying input power to the electric power source, electronic controller for the electric motor and thermal engine, a pneumatic solenoid valve and a pressure transducer. A rotary screw air compressor is particularly suitable to be driven by the motor because the output torque of the motor is intended to be kept constant under the condition of changing pressure in the preferred embodiment, however the invention is applicable to other types of compressors, such as piston, screw and scroll types. A proxy variable for motor torque, typically current drawn by the motor, is monitored by a motor controller.

In its preferred embodiment, the invention is applied to a hybrid vehicle equipped with a thermal engine and a high voltage DC generator, which replaces the alternator typically used on conventional vehicles. A power supply for the variable speed motor can be the high voltage generator, or a DC to DC converter that supplies the power to the heater, ventilation and air conditioning (HVAC) system, the engine fan, the power steering and to the air brakes. The power supply is supplemented by a battery unit. The motor controller has the functions of motor speed control and other programmable controls such as diagnostics for an air brake system. The whole compressed air supply system, including particularly the motor and a screw compressor, can be mounted on a suitable place of the chassis of a vehicle, or on the trailer towed by the vehicle, where it is far removed from the engine and can operate at a lower temperature than that to which they would be exposed in the engine compartment. The air compressor has its own lubrication system and cooling system. The solenoid valve, air pressure transducer, air tank and air dryer of the air supply system are typically standard, prior art components. The solenoid valve and air pressure transducer are mounted on the original air tank and air dryer. Air utilizing circuits, such as air brakes, are unaffected by the changes to the compressed air supply system.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
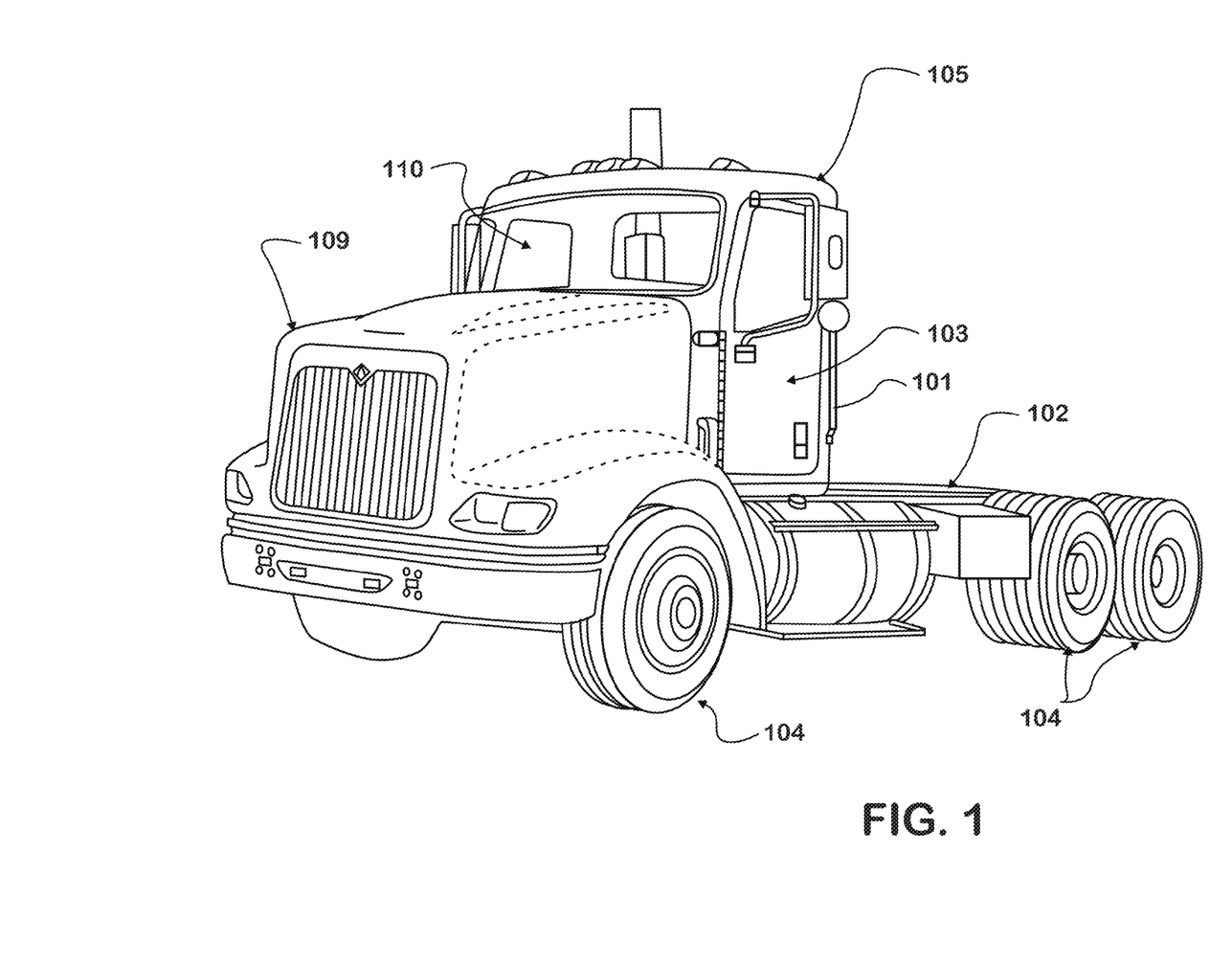
FIG. 1 is a perspective view of a truck.

Referring now to the drawings and in particular to FIG. 1, a truck 101 supporting an air utilizing system is shown. Truck 101 may be a conventional, or a hybrid diesel-electric vehicle, but is otherwise conventionally equipped with wheels 104 which support a chassis 102 which in turn carries a cab 105. Cab 105 is provided with an engine compartment 109, a greenhouse 110 and a door 103.

Figure 2:
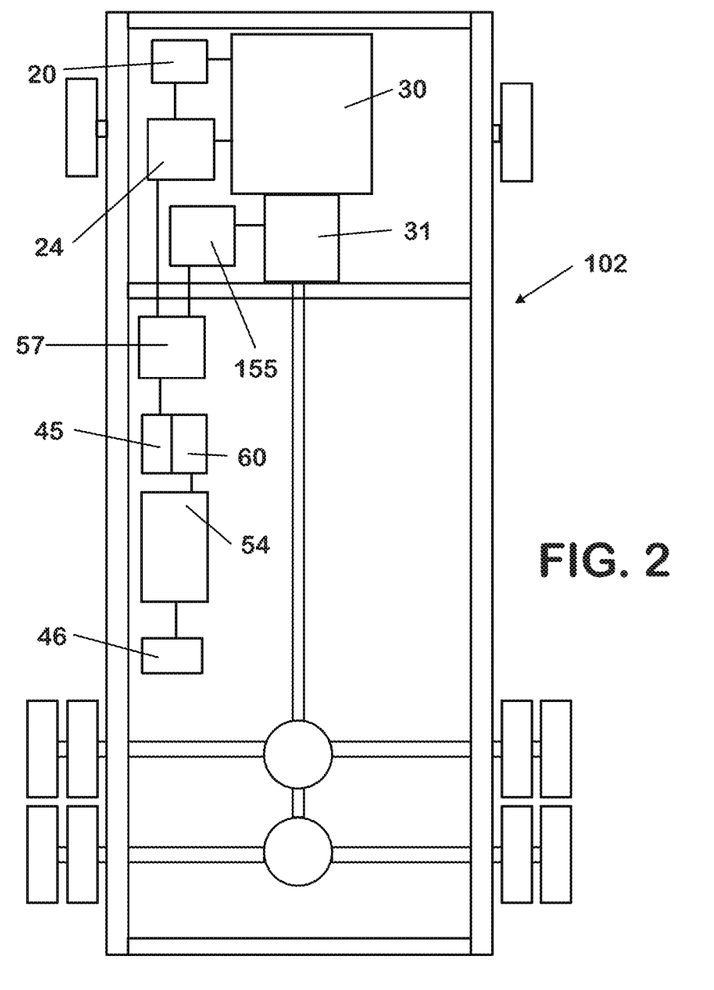
FIG. 2 is a schematic illustration for a control system for the truck of FIG. 1.

FIG. 2 is a schematic view of vehicle chassis 102. A conventional internal combustion engine or prime mover 30 with a drive train element 31 is shown at the front end of the chassis 102. The details of the electrical power system are omitted save for depiction of a high voltage DC source 155 which is shown coupled to a drive train element 31. Drive train element 31 is preferably a traction motor/generator for a hybrid vehicle, but could be a transmission in a conventional vehicle. A body controller 24 is connected to an engine controller 20 and to an compressed air supply system controller 57. System controller 57 controls the amount of power supplied from the high voltage DC source 155 to a variable speed motor 45 in response to air demand related and other input variables. Motor 45 is, in turn, mechanically coupled to an air compressor/air pump 60. The air compressor 60 supplies compressed air to a compressed air storage facility 54, which in turn supplies compressed air to an air utilizing system 46, such as pneumatic brakes or a pneumatic power take-off system. The variable speed motor 45 and compressor 60 are advantageously positioned on the chassis 102 at a location displaced aft from the engine 30 and the engine compartment at the front of the chassis. The character of the high voltage DC source 155 depends upon what type of vehicle is under consideration. For a hybrid vehicle the DC source 155 performs voltage regulating functions. In a conventional vehicle it includes a DC generator.

Figure 3:
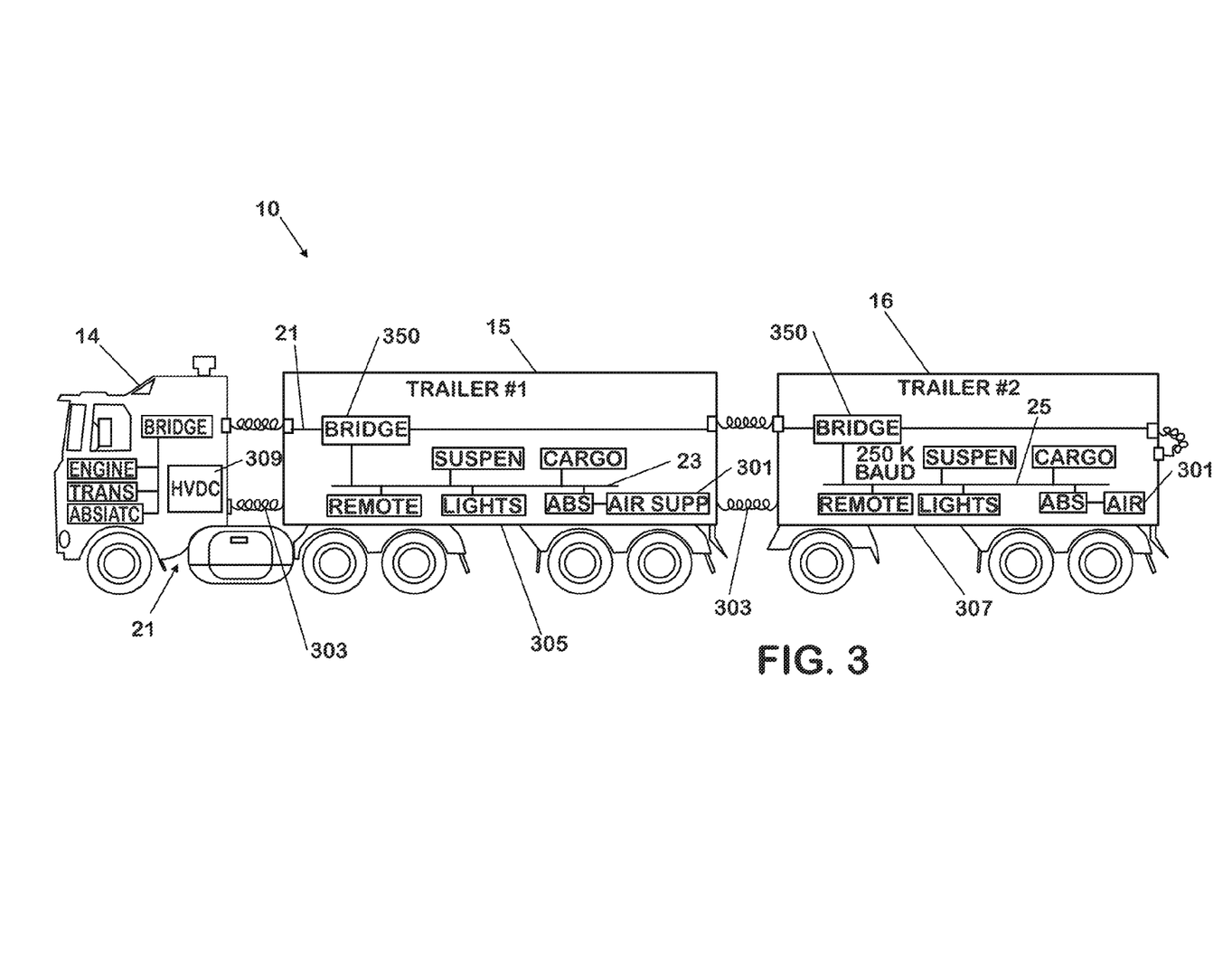
FIG. 3 is a schematic view of a tractor/trailer combination illustrating one application of the invention.

Because the present invention uses electric motors to drive air compressors rather than using a direct mechanical linkage to the vehicle engine, the invention is readily adapted to allow air compressors for trailer brakes and air suspension systems to be installed on the trailers. This reduces the risk of trailer brake failure due to loss of air supply from a tractor. FIG. 3 is a schematic view of control arrangements for a tractor/trailer combination 10 assembled from a tractor 11 and first and second trailers 15, 17. Sources of compressed air are distributed to the trailers with electrical power coming from the tractor. Tractor 11 and the first and second trailers 15, 17 have control networks (respectively networks 21, 23, 25) installed thereon which are linked using bridges 350. Networks 21, 23 and 25 allow data communication between controllers connected to the respective networks and the bridges 350 allow data to be passed between the networks. Of interest to the present invention is that the first and second trailers 15, 17 have compressed air supply systems 301 which are independent of the tractor's compressed air supply system but which may be powered by the tractor's high voltage DC power system 309. The compressed air supply systems 301 include the same components, including a motor, air tanks, pressure gauges, etc. as shown on the vehicle of FIG. 2 and rely on the same inputs as described below. The compressed air supply systems 301 are supplied with electrical power from a high voltage direct current (HVDC) source 309 installed on tractor 11 by power cables 303 connecting the onboard power busses 305 and 307. Trailers have conventionally been supplied with both electrical power and compressed air from tractors, and the provision of independent air supply systems for the trailers allows the elimination of a compressed air supply hose from the tractor to and between the trailers.

Figure 4:
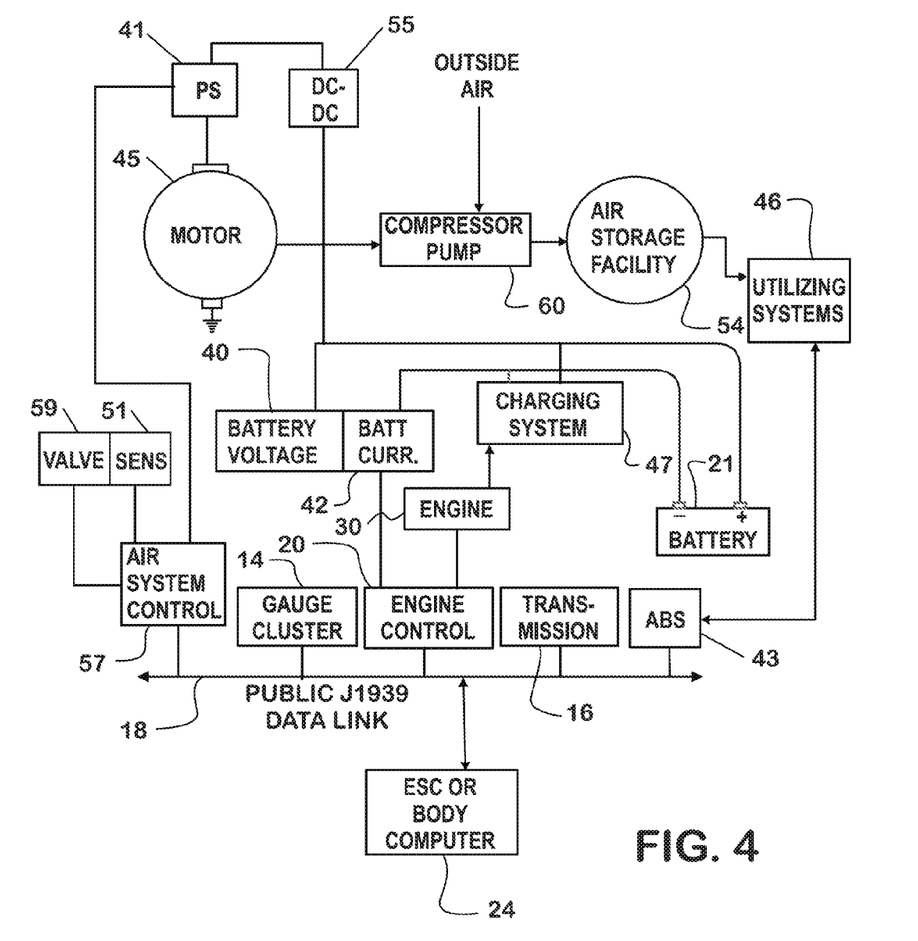
FIG. 4 is a block diagram of an air pressurization and storage system.

FIG. 4 is a high level schematic of a control system for a vehicle of general applicability. Elements of an air supply system in accordance with the invention are shown to illustrate one way of integrating the invention with a vehicle control system. The control system is based on network technology, preferably a controller area network (CAN). The network depicted is for a tractor, though in a simplified form it is applicable to a trailer. The backbone of the network is a system bus or public data link 18. Public data link 18 is preferably a twisted pair cable which conforms to the Society of Automotive Engineers (SAE) J1939 protocol for controller area networks (CAN). Several controllers are coupled to public data link 18 for the receipt and transmission of data over the public data link.

Among the controllers connected to the public data link 18 are a body computer 24, sometimes called an electrical system controller (ESC), a gauge cluster controller 14, and engine controller 20 and a transmission controller 16. An anti-lock brake system controller 43 represents a controller for a compressed air utilizing system 46 which is connected to a compressed air storage facility 54. The compressed air utilizing system uses compressed air from the air storage facility 54 resulting in discharge of air from the storage facility. An air compressor system controller 57 is also illustrated coupled to the public data link 18 and further coupled to air flow control valves 59 and pressure sensors 51. The motor vehicle includes a thermal engine 30 under the control of an engine controller 20. The engine 30 may be installed in a hybrid vehicle in which case a traction controller may be added or substituted for the transmission controller 16.

The system depicted in FIG. 4 is of general application and is not specific to a hybrid vehicle, though in the case of either a conventional or hybrid vehicle a charging system 47 is provided. In a hybrid vehicle it is a high voltage DC generator. While the system could be applied to a conventional vehicle, it is unlikely that a conventional alternator and 12 volt DC vehicle electrical system would provide the electrical power required by the system. Weight savings are achieved in the preferred embodiment through the use of small displacement, high speed components.

It is intended that operation of the air utilizing system not be affected by presence of an air compression system controller. The air compressor system controller 57 controls a power supply 41 used to apply power to the motor 45 for driving compressor pump 60 responsive to indications of a demand from airflow however, and it is expected that such indications would come from the controller for an air utilizing system 46, such as a brake system under the control of an anti-lock brake system controller 43. Thus elements of the air compressor system may be combined with elements of an air brake or air suspension system in order to increase modularity and to reduce the overall number of components and the number of air hose connections and thereby reduce maintenance demands. For example, data for air pressure in the utilizing system 46 may be taken as an indication of pressure in the storage system 54 and reported over the public data link 18 from ABS controller 43 and read from the link by the air system controller 57.

While operation of the air utilizing system requires little change, the particulars of the air supply system and its operation have consequences for the operation of the vehicle's thermal engine, beginning with elimination of the mechanical linkage from the engine to a compressor. Electric motor 45 is preferably a high voltage, variable speed, direct current (DC)

electrical motor, although it can be a brushless DC or variable speed AC motor. While the ultimate power source for the motor 45 is engine 30, the motor is directly energized in one embodiment from a DC-DC converter 55. DC-DC converter 55 steps down the voltage from the electrical power generation and storage plant including charging system 47 and battery 21. It is expected that a high voltage DC source is used and not a conventional 12 volt DC system, which is unlikely to produce enough electrical power to meet the requirements of the present system. The battery 21 and charging system 47 are preferably part of the traction system for a hybrid vehicle, though vehicle electrical systems operating at higher voltages than 12 volt systems may be used. Motor 45 speed is regulated by air pressure system controller 57 in response to pressure readings related to the pressure in the storage facility 54. Motor 45 drives an air compressor pump 60 which delivers outside air to the storage facility 54. Storage facility 54 may include a dryer, a primary tank and an auxiliary/secondary tank and conceptually may be considered to extend to delivery pipes, hoses and other components of a utilizing system 46 which are routinely pressurized when air flow is not demanded. In total these possible reservoirs for air may be termed the system's reserve capacity and accordingly the pressure measurements underlying demands for operation of motor 45 may, in theory, be located any where they can communicate with this reserve capacity, though it is preferred to use extant pressure sensors on the compressed air storage tanks. The use of electrical motor 45 to drive the compressor pump 60 allows the motor and compressor to be readily located elsewhere on the vehicle other than within the engine compartment. The location may be chosen to ease access to the motor 45 and compressor 60 for maintenance, particularly as compared to an engine compartment location.

ESC 24 may be programmed to optimize vehicle operation while minimizing immediate power demand, consistent with pressurizing tanks within a given time period. Thus programming relating to air system controller 57 operation may be resident on ESC 24 and the air system controller 57 slaved to the ESC 24.

Figure 5:
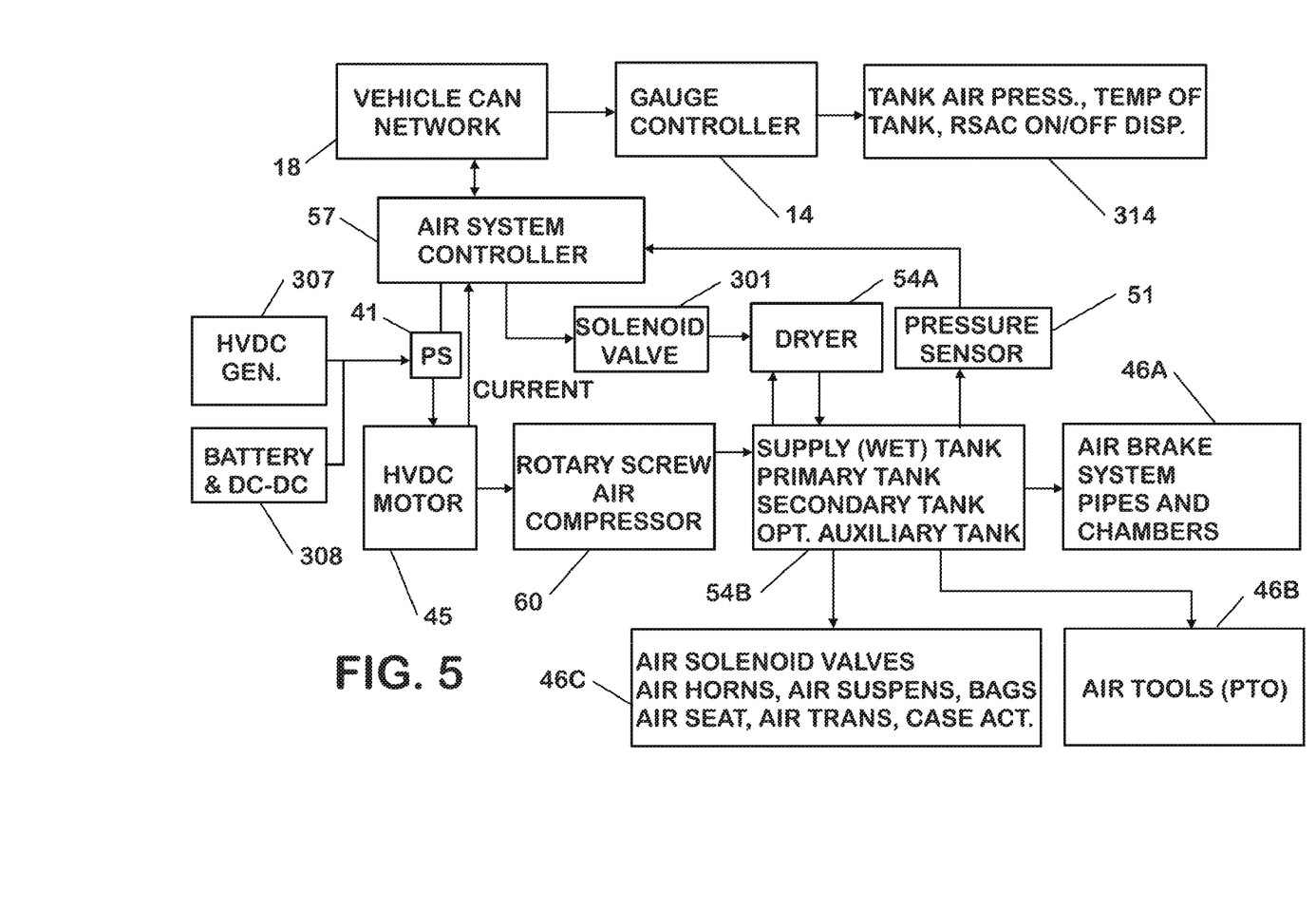
FIG. 5 is a block diagram of a feedback control system for a variable speed air charging system.
Figure 6:
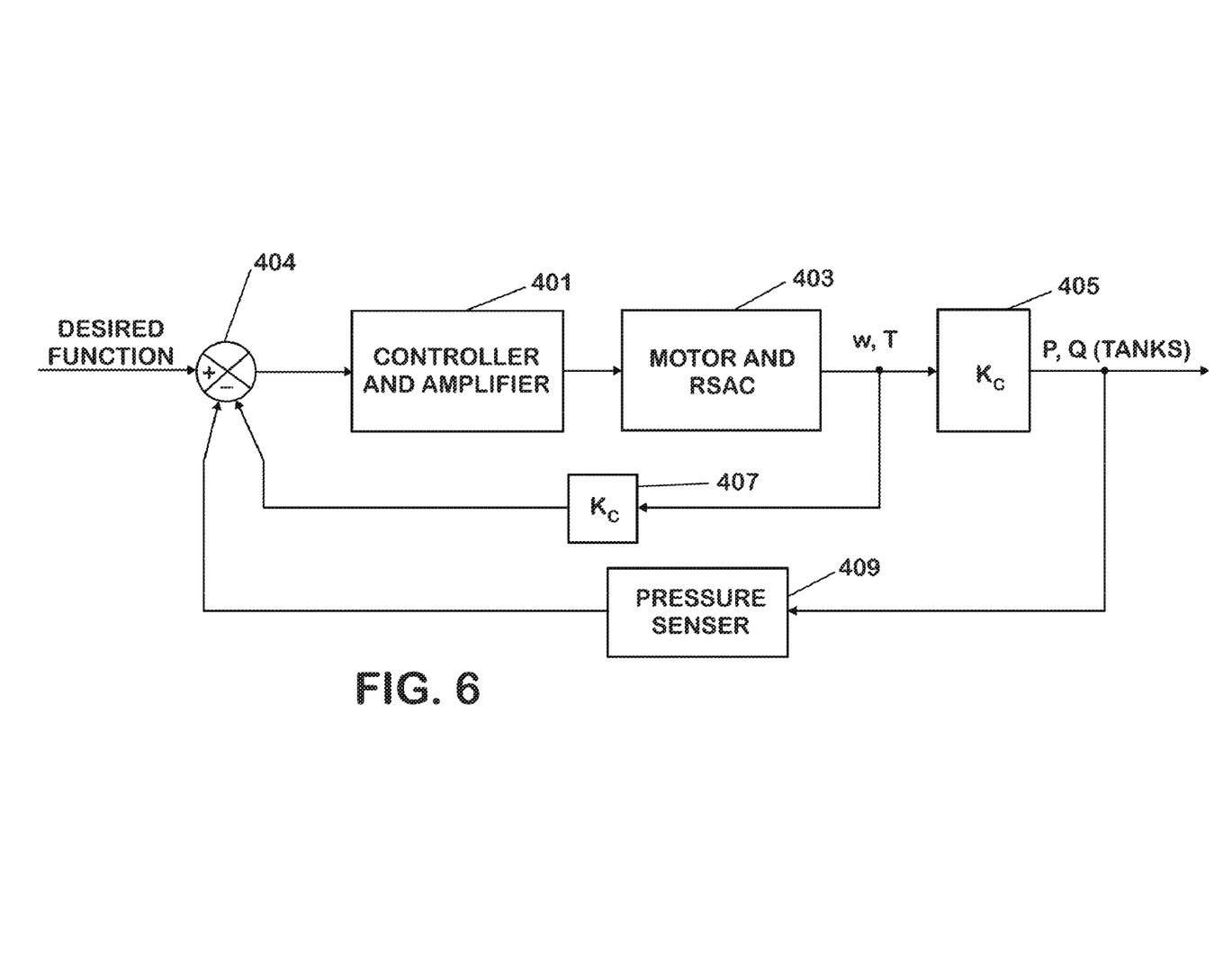
FIG. 6 is a flow chart for an ON/OFF air charging system.

Referring now to FIG. 5, a more detailed block diagram of elements under the control of the air compressor system controller 57 is shown. Air system controller 57 receives and sends data over a vehicle CAN network/public data link 18. For the embodiment illustrated, air system controller 57 reports sensor data, including storage tank air pressure, storage tank air temperature and compressor on/off status over the vehicle public data link 18 from which they can be read by a gauge controller 14 and displayed on display elements 314. The air system controller 57 or the ESC 24 can implement and report diagnostics, for example leaks, loss of pressure, loss of motor function, etc.

The air compressor unit includes a motor 45 and a rotary screw compressor 60 which can be mounted at a suitable place on the chassis of a vehicle, preferably far from the engine, to reduce operating temperatures compared to the engine area. Air system controller 57 can be mounted in the cab which protects the controller from harsh environmental conditions. A solenoid valve 301 is disposed to control air flow through an air dryer 54A, which removes moisture being transferred between wet tanks and the primary/secondary tanks of the larger air storage facility 54B. An air pressure transducer 51 (and other sensor) is mounted to one or both of the air tanks, preferably the primary supply tank, to obtain pressure readings and to supply the readings to the air system pressure controller 57 for use in controlling the motor 45 and valve 301 and for passing readings to the gauge controller 14.

There is no requirement with the present invention to alter the prior art air brake systems 46A (or other air utilizing systems such as power take off (PTO) systems 46B or air suspension systems 46C) and air tanks, which mean that air brake functions of the vehicle are not affected. The motor 45 is driven by 360 VDC high voltage DC motor that is supplied by a 360 VDC high voltage DC generator 307 or a high power battery with DC-DC converter 308. A rotary screw air compressor 60 has its own lubrication system and cooling system. The source of the coolant is from the separate water cooling tank that is used to cool the Hybrid-Electric Vehicle trucks. The speed of the DC motor and air compressor is easily changeable through a DC motor controller. The power delivered by the controller 57 to the HVDC motor 45 may be limited responsive to high coolant temperature.

Air system controller 57 also controls activation of the HVDC motor 45 by operation of a power supply 41 which provides for connecting the motor to a source of power. The source of power may be a battery combined with a DC-DC converter 308 which adjusts the voltage or a high voltage DC generator 307.

While the vehicle control network is active, the air pressure sensor 51 sends periodic air pressure readings for the tanks 54B to the air system controller 57. If the air pressure of the particular supply tank 54B is less than a set minimum value, such as 100 psi, the air system controller resets power supply 41 to start the motor 45 and air compressor 60 to charge the air tank system 54B. Initially power supply 41 supplies power to motor 45 to run at higher speeds. As pressure increases in tanks 54B, power is held constant or ramped down. When the pressure of supply tank increases to a set maximum value, such as 125 psi, the controller sets power supply 41 to shut off the motor 45 and air compressor 60 which stops the air charging operation. Target air pressure values of 100 to 125 psi work for conventional air brake systems 46A. Different ranges may be used depending upon the specific application. Brake operation, including as few as four full stroke brakes can result in tank air pressure dropping below 100 psi and the motor 45 and compressor 60 starting. The speed of motor 45 and compressor 60 are made variable, in accordance with controller programming.

A variable speed strategy can reduce peak power consumption of the motor/compressor unit by 32% compared to a constant speed compressor unit. It may be noted that peak power demand by a constant speed motor would occur just as pressure in the storage tanks reached the cut-off value and would not correspond to periods when quick re-pressurization was necessary. Instead of governor control as used with conventional, engine-driven air compressors, electric motor 45 driven air compressor 60 uses an air solenoid valve 301 to control the air dryer 54A. When air pressure of air tank system reaches the limit value of 125 psi, the motor and compressor are off and the air solenoid valve 301 opens and the purge cycle of the air dryer begins. Generally the purge cycle is 15 to 30 seconds. After the purge cycle is completed, the air dryer 54A is ready for next cycle. When air brakes operate and the system pressure drops to minimum value 100 psi, controller 57 starts motor 45 and compressor 60 to charge the system and the solenoid valve that controls the dryer is shut down.

The air system controller 57 provides diagnostic functions by monitoring the conditions of the air supply system and monitoring for component faults. Hot sensing is completed by the temperature sensor. Diagnostic measurements of leaking or loose connection conditions are made using piezoelectric pressure sensors. Leaks are detected with pressure sensors and information over the CAN 18 indicating brake operation. The air compressor 60 and dryer 54A meet air brake system requirements and federal motor vehicle safety standards (FMVSS) 121 regulations. In addition, because the power input level to the compressor pump 60 is known along with essentially coincident air pressure readings and system parameters for the air storage facility 54, the design rate of pressurization of the air storage system 54 is known. Deviations from the design rate of pressurization may be correlated with possible failure or fault conditions. It will be understood that the illustration of a system with air tanks does not exclude application of the invention to the system where the systems reserve air is kept in the delivery lines, that is to say the utilization system provides all the reserve capacity.

Control strategies for operation of the compressor 60 and dryer 54A can also follow from the way the vehicle is driven and the availability of control options stemming from the presence of the CAN bus 18. Primary strategy uses J1939 bus to integrate functions with truck. For example, operation of the air brake system stops the air compressor to save energy when the air brake system is discharging air to stop the vehicle.

The preferred mode of implementing the invention is to use a 360 Volt-DC motor 45 to drive a rotary screw air compressor 60. Air system controller 57 provides variable speed control of the motor 57 responsive to tank air pressure. The air compressor unit 60 is mounted on a suitable place of the vehicle. The electronic controller is integrated to truck system through J1939 Can bus. The system uses existing air tanks and air brakes and air dryer. As illustrated as a feed back control system in FIG. 5, the preferred mode includes feedback loops providing current motor rotational velocity and pressure readings. A summer 404 subtracts the feedback signals from a tachometer 407 and a pressure sensor 409 from a desired function and feeds the resulting signal to an controller/amplifier 401. The controller/amplifier sets the strength of the drive signal to motor 403, which in results in varying the speed of compressor 405.

Figure 7:
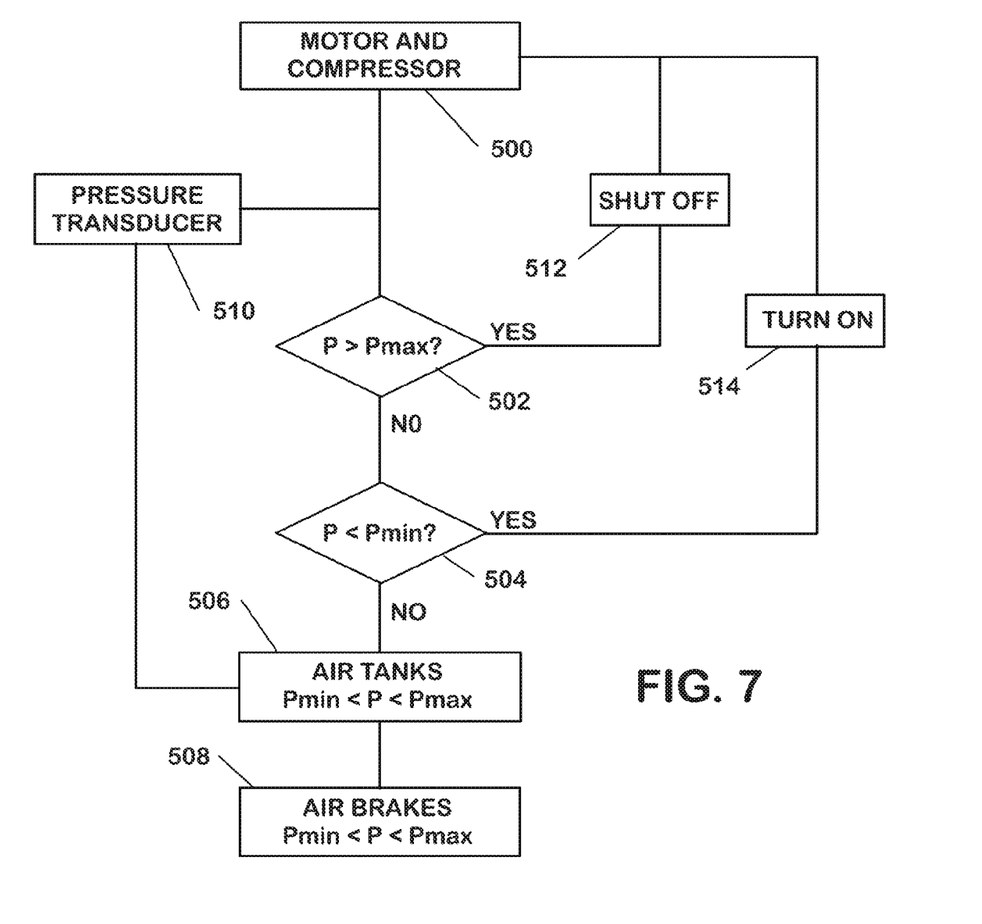
FIG. 7 is a basic flow chart illustrating compressor operation.

Referring to FIG. 7, a flow chart for a minimal ON/OFF type control system controlled strictly in response to measured pressure is illustrated. Steps 502 and 504 provide for turning motor 500 off and on respectively. Air tank and air brake system pressure are measured (steps 506, 508) by interrogating the pressure transducer 510. The additions of the present invention are applied in the context of the basic control requirement of keeping air pressure in a storage tank within pre-selected levels. The minimum pressure effectively triggers pressurization. Safety mandates for brake systems dictate the maximum allowed times (i.e. a time limit or time constraint) before full re-pressurization is achieved. Variable speed control of the motor may be implemented in a high resolution step wise fashion.

Selecting an optimal speed program for motor 45 to drive the air compressor 60 can dramatically save energy. The particular size of motor and compressor of course depend upon the size and weight of vehicle to which the system is applied, but modeling suggests substantial savings in energy can be obtained where optimal speeds of motor and air compressor for a particular air brake application are provided. Since power input and system parameters are known, pressure in the system should track expected values during operation of the compressor. It is expected in brake systems that the compressor is cut off during braking so long as pressure in the system is above the 100 psi minimum required. Accordingly, variation of measured pressure from expected pressure may indicate a fault in the system.

Figure 8:
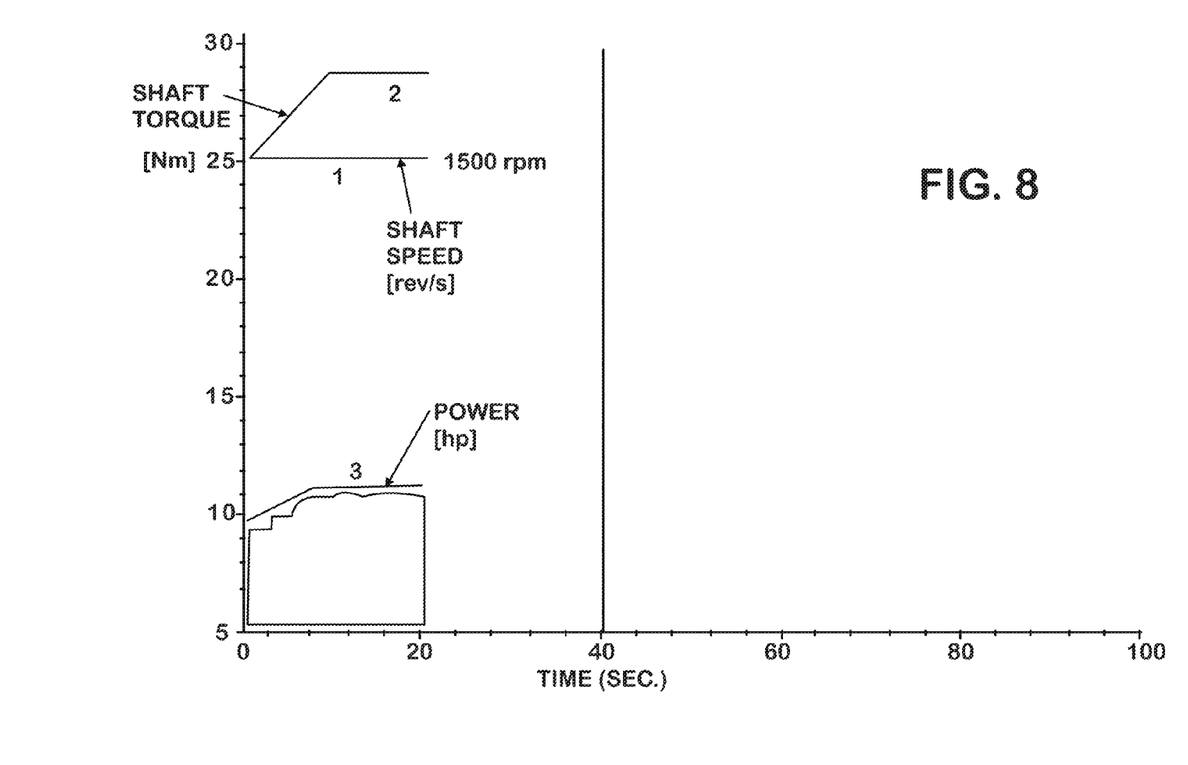
FIG. 8 is a graph illustrating an operational regime for the compressor.
Figure 9:
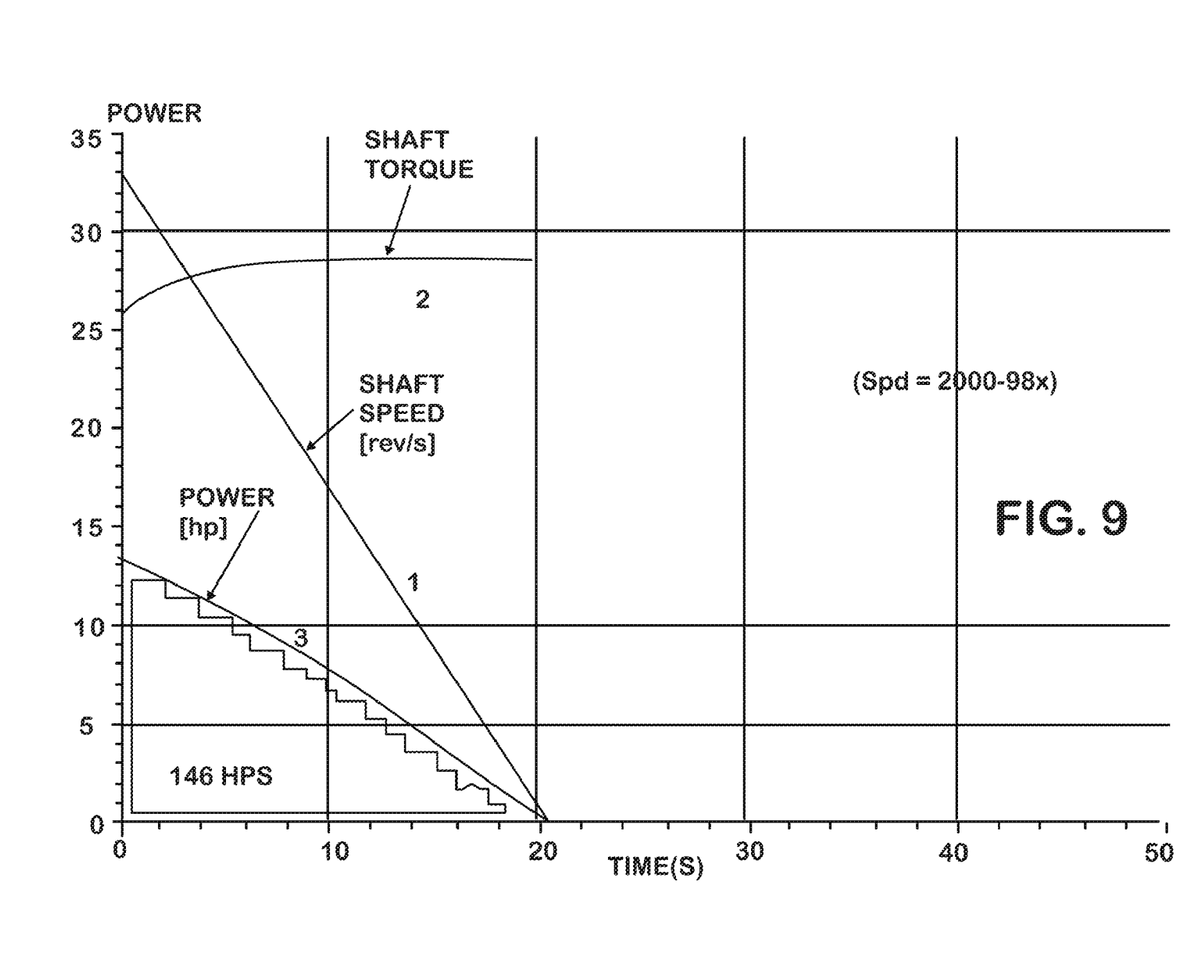
FIG. 9 is a graph illustrating an operational regime for the compressor.
Figure 10:
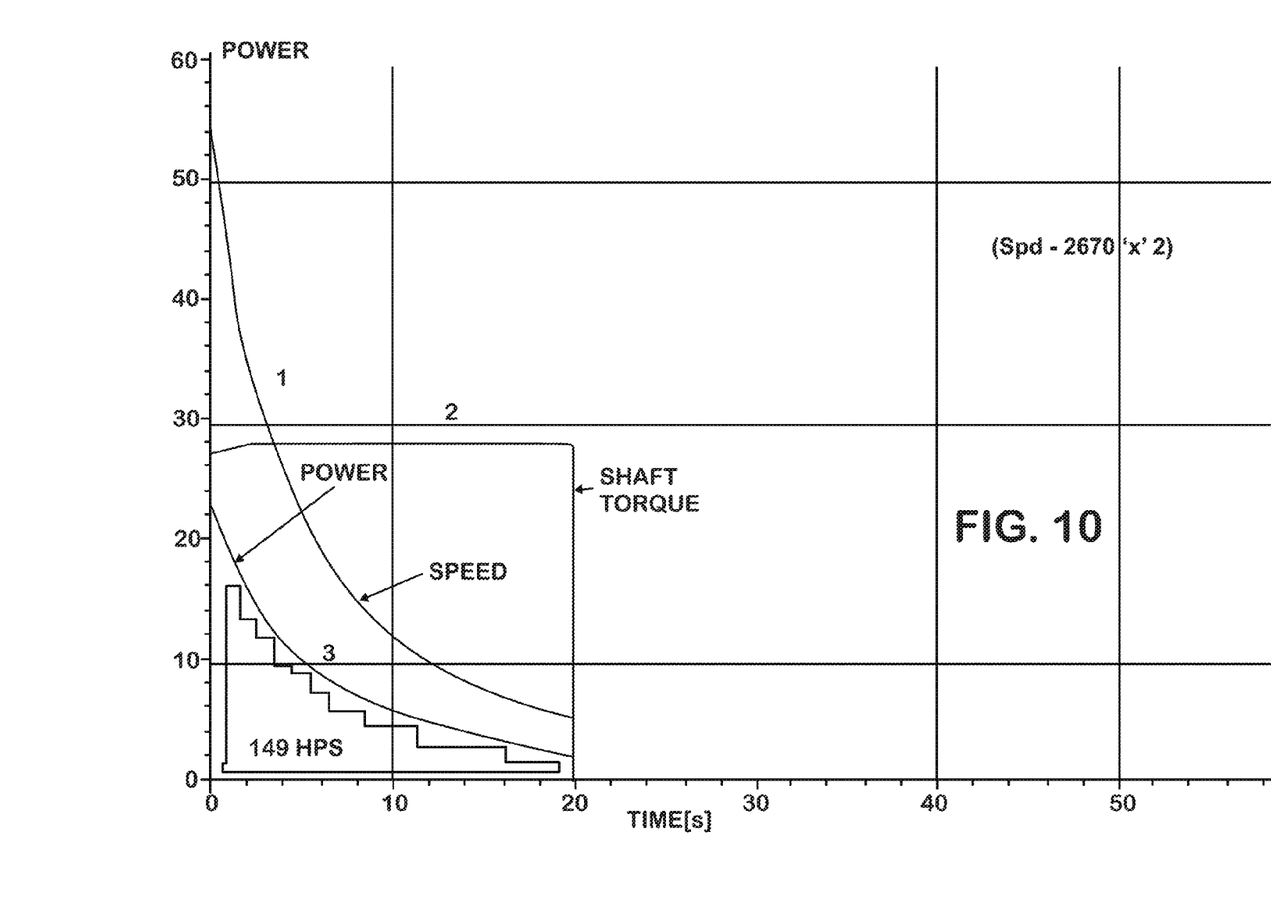
FIG. 10 is a graph illustrating an operational regime for the compressor.

FIGS. 8, 9 and 10 provide a comparison between differing compressor motor speed strategies, with shaft speed (1), shaft torque (2), power (3) and total energy expended (integral under power) compared. FIG. 8 illustrates power usage of an ON/OFF control strategy where the motor 45 is allowed to draw power as required to maintain a constant speed on a shaft into the compressor 60. Shaft torque increases in parallel with power consumption. FIG. 9 illustrates a scenario in which shaft speed is reduced so that power utilized is constant as pressure builds to the target maximum pressure. Torque starts at a relatively high value and increases at a decaying rate, here to a non-zero asymptote, until the compressor pump is cut off. Power output falls linearly and exhibits a maximum value below that exhibited under the FIG. 10 scenario. FIG. 10 illustrates a scenario in which shaft speed and energy input is reduced toward zero asymptotically. Shaft torque is essentially kept constant. Modeling suggests power consumption is minimized under a scenario of linearly reducing shaft speed and avoiding operation which produce a surge in power output. Design parameters require that the design maximum pressure be restored within an allotted maximum period. The scenario used in FIG. 9 required in simulation models 146 horse power seconds of energy versus 149 horse power seconds in the scenario of FIG. 10. Either result was substantially better than the result obtained by running the shaft at a constant speed in an ON/OFF regimen.

The present invention has a number of advantages. Since the air compressor does not track the engine over its potential range of operation from 600 to 3000 RPM, the compressor can be run at high speed, for example 6000 to 10000 RPM, independently of engine speed. This allows the use of a smaller displacement compressor of lighter weight and lower cost. Rotary, screw and scroll compressors, which allow higher speed operation are favored over piston pumps. An operational routine providing for reducing air compressor speed with increasing pressure and discontinuing air compressor operation at target pressures, and potentially under high load conditions on the vehicle reduces torque loads on the thermal engine and improves emissions by reducing engine load transients when the pump motor turns on and off.

While the invention is shown in only one of its forms, it is not thus limited but is susceptible to various changes and modifications without departing from the spirit and scope of the invention.

What is claimed is:

1. A compressed air supply system for a motor vehicle, comprising:
    a variable speed electric motor having a shaft;
    an air compressor coupled to be driven by the variable speed electric motor;
    a controllable power supply including a generator, the controllable power supply providing electric power output at selected levels to the variable speed electric motor;
    a thermal engine for energizing the generator;
    an air storage facility connected to receive air from the air compressor;
    an air utilization system connected to receive air from the air storage facility;
    a controllable power supply control pressure sensor for generating pressure readings for air pressure in the air storage facility; and
    an air supply system controller connected to receive the pressure readings and responsive thereto for varying the output of the controllable power supply applied to the variable speed electric motor to progressively reduce the speed of the variable speed electric motor with increasing pressure in the air pressure storage facility during pressurization.

2. A compressed air supply in accord with claim 1, further comprising:
the air supply system controller being responsive to pressure readings to initiate operation of the variable speed electric motor at a high output level and to progressively decrease power delivered to the variable speed electric motor as the indicated pressure from the pressure readings increases by control of the power output from the controllable power supply.

3. A compressed air supply in accord with claim 2, further comprising the air supply system controller being programmed to reduce power asymptotically to zero.

4. A compressed air supply in accord with claim 2, further comprising the air supply system controller being programmed to reduce power linearly toward zero over time with the zero power intercept occurring within a preset time limit.

5. A compressed air supply in accord with claim 2, further comprising:
a controller area network installed on the vehicle;
an engine controller connected to the controller area network and further connected to control and monitor operating variables of the thermal engine;
the air supply system controller connected to the controller area network; and
an air utilization system controller connected for communication over the controller area network.

6. A compressed air supply in accord with claim 5, further comprising:
the controllable power supply supplying power to the variable speed electric motor to start an operation and to reduce rotational speed of the shaft continuously from shortly after onset of operation at the pressurization trigger level to cessation of operation at the target pressure level.

7. A compressed air supply in accord with claim 6, further comprising:
the reserve capacity including storage tanks for an air brake system.

8. A compressed air supply in accord with claim 7, further comprising:
the controllable power supply being a direct current power supply.

* * * * *